(12) United States Patent
Carlos et al.

(10) Patent No.: US 10,574,735 B2
(45) Date of Patent: Feb. 25, 2020

(54) APPLICATION OF ASSET CONTROL FEATURES TO ASSETS IN A SHARED WORKSPACE

(71) Applicant: Prysm, Inc., San Jose, CA (US)

(72) Inventors: Dino Cris Carlos, Fishers, IN (US); Adam P. Cuzzort, Westfield, IN (US); Brandon Fischer, Carmel, IN (US)

(73) Assignee: Prysm, Inc., San Jose, CA (US)

( * ) Notice: Subject to any disclaimer, the term of this patent is extended or adjusted under 35 U.S.C. 154(b) by 0 days.

(21) Appl. No.: 15/159,594

(22) Filed: May 19, 2016

(65) Prior Publication Data

US 2017/0339216 A1 Nov. 23, 2017

(51) Int. Cl.
*G06F 15/16* (2006.01)
*H04L 29/08* (2006.01)

(52) U.S. Cl.
CPC .............. *H04L 67/10* (2013.01); *H04L 67/02* (2013.01); *H04L 67/06* (2013.01); *H04L 67/142* (2013.01)

(58) Field of Classification Search
CPC .......... H04L 67/10; H04L 67/02; H04L 67/06
USPC ................................................. 709/203, 205
See application file for complete search history.

(56) References Cited

U.S. PATENT DOCUMENTS

| 6,937,730 | B1* | 8/2005 | Buxton | H04N 7/163 |
| | | | | 348/E7.061 |
| 9,749,367 | B1* | 8/2017 | Kirby | H04L 65/403 |
| 10,104,129 | B1 | 10/2018 | Fischer et al. | |
| 10,454,976 | B2 | 10/2019 | Fischer | |
| 2006/0248599 | A1 | 11/2006 | Sack et al. | |
| 2007/0043673 | A1* | 2/2007 | Hirano | G06Q 20/3674 |
| | | | | 705/51 |
| 2007/0300306 | A1* | 12/2007 | Hussain | G06F 21/6218 |
| | | | | 726/27 |
| 2009/0044251 | A1* | 2/2009 | Otake | H04L 63/102 |
| | | | | 726/3 |
| 2009/0089379 | A1 | 4/2009 | Pegg | |
| 2012/0291133 | A1 | 11/2012 | Nagpal et al. | |
| 2014/0033067 | A1 | 1/2014 | Pittenger et al. | |
| 2014/0033265 | A1* | 1/2014 | Leeds | G06F 21/10 |
| | | | | 726/1 |

(Continued)

OTHER PUBLICATIONS

"Non-Final Office Action", U.S. Appl. No. 15/183,539, dated Feb. 27, 2018, 14 pages.

(Continued)

*Primary Examiner* — Duyen M Doan
(74) *Attorney, Agent, or Firm* — SBMC

(57) ABSTRACT

Various embodiments enable one or more appliances to participate in a shared workspace. The shared workspace can include a single appliance, multiple appliances, a single meeting room, multiple meeting rooms, or any combination thereof. The state of various meeting participants can be identified and one or more rules can be applied to the participants' state to provide an outcome. An "outcome" can be thought of as an action that is to be performed responsive to the identified state. An asset interaction control feature can be selected based on the outcome. The asset interaction control feature controls, in some manner, a participant's interaction with one or more assets that are part of the shared workspace. The asset interaction control feature is then applied to at least one of the assets.

23 Claims, 9 Drawing Sheets

(56) References Cited

U.S. PATENT DOCUMENTS

| | | | |
|---|---|---|---|
| 2014/0074923 A1* | 3/2014 | Vasudevan | G06F 21/10 |
| | | | 709/204 |
| 2014/0187152 A1* | 7/2014 | Johnson | H04B 5/0031 |
| | | | 455/41.1 |
| 2016/0248766 A1* | 8/2016 | Tembey | H04L 63/0227 |
| 2017/0160951 A1 | 6/2017 | Borlick et al. | |
| 2017/0353445 A1 | 12/2017 | Steeves et al. | |
| 2019/0036979 A1 | 1/2019 | Fischer et al. | |

OTHER PUBLICATIONS

"Non-Final Office Action", U.S. Appl. No. 16/151,172, dated Dec. 3, 2018, 9 pages.

"Notice of Allowance", U.S. Appl. No. 15/183,539, dated Jun. 29, 2018, 11 pages.

"Final Office Action", U.S. Appl. No. 16/151,172, dated Jun. 5, 2019, 7 pages.

"Notice of Allowance", U.S. Appl. No. 16/151,172, dated Aug. 16, 2019, 7 pages.

* cited by examiner

APPLICATION OF ASSET CONTROL FEATURES TO ASSETS IN A SHARED WORKSPACE

BACKGROUND

Currently, digital content may be shared between different computer devices implementing various techniques. During a content sharing session, a shared workspace that includes various types of digital content may be displayed on multiple computer devices at different physical locations, or a shared workspace displayed on one computer device may be shared with different remote computer devices.

During any particular content sharing session, there can be a number of users at a number of different locations. Sometimes the number of users may be unknown as well as whether individual users are authorized to view or otherwise consume content being shared within the content sharing session. Inadvertently sharing content with users who are not authorized to view or consume the content can have adverse consequences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Various embodiments enable a system to identify the number of meeting participants who are participating in a content sharing session, their relative locations within an associated meeting room within which the content sharing session is taking place, and individual levels of authorization, or lack thereof, to consume assets being presented within the content sharing session. Based on information identified by the system, intelligent decisions can be made with respect to exposing assets during the content sharing session. For example, in a single meeting room scenario, an individual who is not authorized to view certain assets may enter the meeting room. Once the system identifies that this new individual is not authorized to view certain assets, the system can, through certain determination steps, obfuscate the assets that the individual is not authorized to view. Obfuscation can include, by way of example and not limitation, visually obscuring or hiding an asset, audibly masking an asset that has an audible component, both visually and audibly obscuring an asset, and the like.

In some embodiments, the system can employ multiple different types of sensors positioned proximate, in, and around a particular meeting room in which the content sharing session takes place. The different types of sensors can, in some instances, be many and varied as will become apparent below.

In embodiments in which a content sharing session takes place in different meeting rooms with different collections of participants, the same approach can be used to ensure that assets are protected from being exposed to participants who are otherwise unauthorized to consume the assets. For example, if two meeting rooms are being employed in a content sharing session and an unauthorized individual enters a first of the meeting rooms or is on the list of participants at a certain location where assets are displayable, once the unauthorized individual is identified, content that is being shared from a second of the meeting rooms to the first meeting room can be obfuscated in the first meeting room so that the unauthorized individual cannot consume the content.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
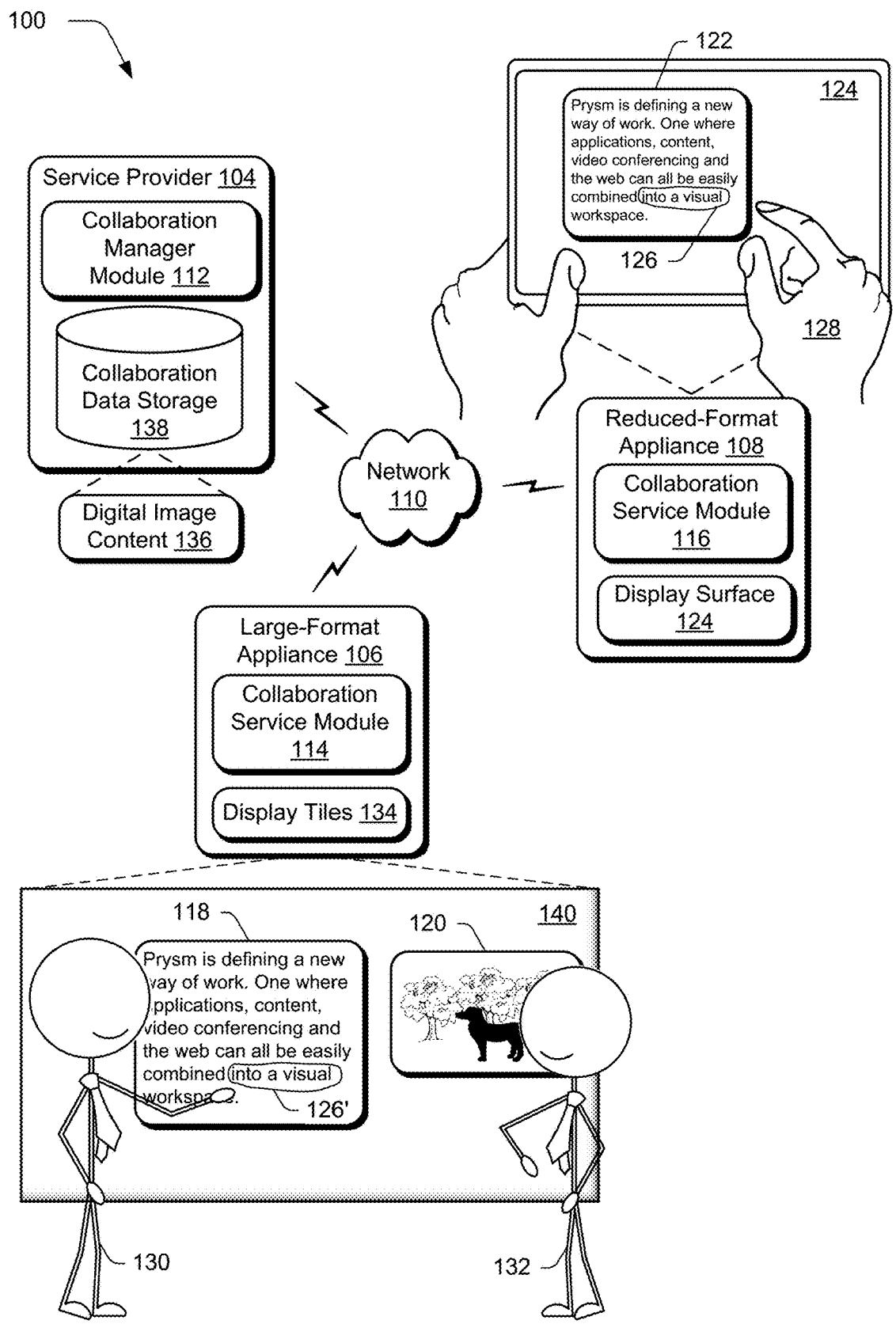
FIG. 1 is an illustration of a collaboration system operable to employ techniques described herein.

FIG. 1 is an illustration of a collaboration system 100 in an example implementation that is configured to implement one or more aspects of the techniques described herein. As shown, collaboration system 100 includes, without limitation, a service provider 104 and appliances that are used to implement a shared workspace, illustrated examples of which include a large-format appliance 106 and a reduced-format appliance 108, each of which are communicatively coupled via a network 110. The large-format appliance 106 is one that has a physically self-supporting display (e.g., greater than 35 inches diagonal) with rich hardware resources including processing, memory, or network resources, which may support simultaneous interaction with a plurality of users as illustrated. The reduced-format appliance 108, on the other hand, has a housing configured to be held by one or more hands of a user or placed on a surface (e.g., as a display device of a personal computer) and may have reduced processing, memory, and network resources in comparison to the large-format appliance 106, which may support single user interaction due to this size. Although large and reduced format appliances 106, 108 are described in relation to the following examples, it should be readily apparent that a plurality of appliances may be made up of appliances that support large or reduced formats, solely.

The service provider 104 is illustrated as including a collaboration manager module 112 and the appliances are illustrated as including respective collaboration service modules 114, 116 that together are representative of functionality implemented at least partially in hardware to support a shared workspace of a collaborative environment as further described in the following. Collaboration service modules 114, 116, for instance, may be configured as software such as applications, third-party plug-in modules, webpages, web applications, web platforms, and so on that support participation as part of a shared workspace. The collaboration manager module 112 is representative of functionality (e.g., implemented via software) that is usable to manage this interaction, examples of which are further described in relation to FIGS. 2-4. Although illustrated separately, functionality of the collaboration manager module 112 to manage the shared workspace may also be incorporated by the appliances themselves.

The collaboration service modules 114, 116, for instance, may be implemented as part of a web platform that works in connection with network content, e.g. public content available via the "web," to implement a shared workspace. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platform can include various web browsers, web applications (i.e. "web apps"), and the like. When executed, the web platform allows a respective appliance to retrieve assets (e.g., web content) such as electronic documents in the form of webpages (or other forms of electronic documents, such as a document file, XML file, PDF file, XLS file, etc.) from a Web server (e.g., the service provider) for display on a display device in conjunction with the shared workspace.

The shared workspace is configured to share asset and user interactions with those assets. In the context of this disclosure, an "asset" may refer to any interactive renderable content that can be displayed on a display, such as on a display device of the large-format appliance 106 or reduced-format appliance 108, among others. Interactive renderable content is generally derived from one or more persistent or non-persistent content streams that include sequential frames of video data, corresponding audio data, metadata, flowable/reflowable unstructured content, and potentially other types of data.

Generally, an asset may be displayed within a dynamically adjustable presentation window. An example of this is illustrated presentation windows 118, 120 for the large-format appliance 106 and presentation window 122 as displayed for the reduced-format appliance 108. For simplicity, an asset and corresponding dynamically adjustable presentation window are generally referred to herein as a single entity, i.e., an "asset." Assets may comprise content sources that are file-based, web-based, or Live Source. Assets may include images, videos, webpages (e.g., viewable within a browser, web-enabled application, web platform), documents, renderings of laptop screens, presentation slides, any other graphical user interface (GUI) of a software application, and the like.

An asset generally includes at least one display output generated by a software application, such as a GUI of the software application. In one example, the display output is a portion of a content stream. In addition, an asset is generally configured to receive one or more software application inputs. The reduced-format appliance 108, for instance, may include a display surface 124 (e.g., implemented by one or more display devices) having gesture detection functionality (e.g., a touch sensitive display device, a display device associated with one or more cameras configured to capture a natural user input, and so forth) to capture a gesture, such as an annotation 126 to circle text in a document made by one or more fingers of a user's hand 128. The annotation is then communicated and displayed on the large-format applicant 106 as annotation 126' that also circles corresponding text in a presentation window 118 that is viewable by users 130, 132 of that appliance. Thus, unlike a fixed image, an asset is a dynamic element that enables interaction with the software application associated with the asset, for example, for manipulation of the asset. For example, an asset may include select buttons, pull-down menus, control sliders, and so forth that are associated with the software application and can provide inputs to the software application.

As also referred to herein, a "shared workspace" is a virtual container of assets along with a virtual digital canvas on which the container's assets associated workspace may be representatively laid out in a manner that when rendered to one or more sized screens there with, the system displays the assets in a manner as represented by the virtual canvas and their corresponding content streams, are displayed within a suitable dynamic "viewport window". Thus, a shared workspace may comprise one or more associated assets (each asset displayed within a presentation window), whereby the entire shared workspace is displayed within a dynamically adjustable viewport window. A shared workspace may be displayed in the entire potential render area/space of a display device of the large-format appliance 106 and/or the reduced-format appliance 108, so that only a single shared workspace can be displayed on the surface thereof. In this case, the area of the viewport window that displays the shared workspace comprises the entire render area of the large-format appliance 106 and/or the reduced-format appliance 108. In other implementations, however, the shared workspace and the viewport window may be displayed in a sub-area of the total display area of the large-format appliance 106 and/or the reduced-format appliance 108 that does not comprise the entire render area of respective display devices of these appliances. For example, multiple shared workspaces may be displayed in multiple viewport windows on the large-format appliance 106 and/or the reduced-format appliance 108 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

The large-format appliance 106 in this example is formed using a plurality of display tiles 134, e.g., arranged to form a display wall. The service provider 104 includes digital image content 136, which is illustrated as stored in collaboration data storage 136, e.g., using one or more memory devices as further described in relation to FIG. 8. The service provider 104 may receive this digital image content 136 from a variety of sources, such as the reduced-format appliance 108, the large-format appliance 106, remotely via a third-party source via the network 110 (e.g., a website), or from an information network or other data routing device, and converts the input into image data signals. Thus, digital image content 136 may be generated locally, with the large-format appliance 106 or the reduced-format appliance 108, or from some other location. For example, when the collaboration system 100 is used for remote conferencing, digital image content 136 may be received via any technically feasible communications or information network, wired or wireless, that allows data exchange, such as a wide area network (WAN), a local area network (LAN), a wireless (Wi-Fi) network, and/or the Internet, among others as represented by network 110. The service provider 104, reduced-format appliance 108, and large-format appliance 106 may be implemented as one or more computing devices, such as part of dedicated computers, as one or more servers of a server farm (e.g., for the service provider 104 as implementing one or more web services), dedicated integrated circuit, and so on. These computing devices are configured to maintain instructions in computer-readable media and that are executable by a processing system to perform one or more operations as further described in relation to FIG. 9.

Display devices of the large-format appliance 106 and/or the reduced-format appliance 108 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, the large-format appliance 106 includes a plurality of display light engine and screen tiles mounted in an array, which are represented by the display tiles 134.

In operation, the large-format appliance 106 displays image data signals received from the service provider 104. For a tiled display, image data signals are appropriately distributed among display tiles 134 such that a coherent image is displayed on a display surface 140 of the large-format appliance 106. Display surface 140 typically includes the combined display surfaces of display tiles 134. In addition, the display surface 140 of large-format appliance 106 is touch-sensitive that extends across part or all surface area of display tiles 134. In one implementation, the display surface 140 senses touch by detecting interference between a user and one or more beams of light, including, e.g., infrared laser beams. In other implementations, display surface 140 may rely on capacitive touch techniques, including surface capacitance, projected capacitance, or mutual capacitance, as well as optical techniques (e.g., sensor in a pixel), acoustic wave-based touch detection, resistive touch approaches, and so forth, without limitation and thus may detect "touch" inputs that do not involve actual physical contact, e.g., as part of a natural user interface. Touch sensitivity of the display surface 140 enables users to interact with assets displayed on the wall implementing touch gestures including tapping, dragging, swiping, and pinching. These touch gestures may replace or supplement the use of typical peripheral I/O devices, although the display surface 140 may receive inputs from such devices, as well. In this regard, the large-format appliance 106 may also include typical peripheral I/O devices (not shown), such as an external keyboard or mouse.

The display surface 140 may be a "multi-touch" surface, which can recognize more than one point of contact on the large-format appliance 106, enabling the recognition of complex gestures, such as two or three-finger swipes, pinch gestures, and rotation gestures as well as multiuser two, four, six etc. hands touch or gestures. Thus, a plurality of users 130, 132 may interact with assets on the display surface 140 implementing touch gestures such as dragging to reposition assets on the screen, tapping assets to display menu options, swiping to page through assets, or implementing pinch gestures to resize assets. Multiple users 130, 132 may also interact with assets on the screen simultaneously. Again, examples of assets include application environments, images, videos, webpages, documents, mirroring or renderings of laptop screens, presentation slides, content streams, and so forth. Touch signals are sent from the display surface 140 to the service provider 104 for processing and interpretation. It will be appreciated that the system shown herein is illustrative only and that variations and modifications are possible.

Figure 2:
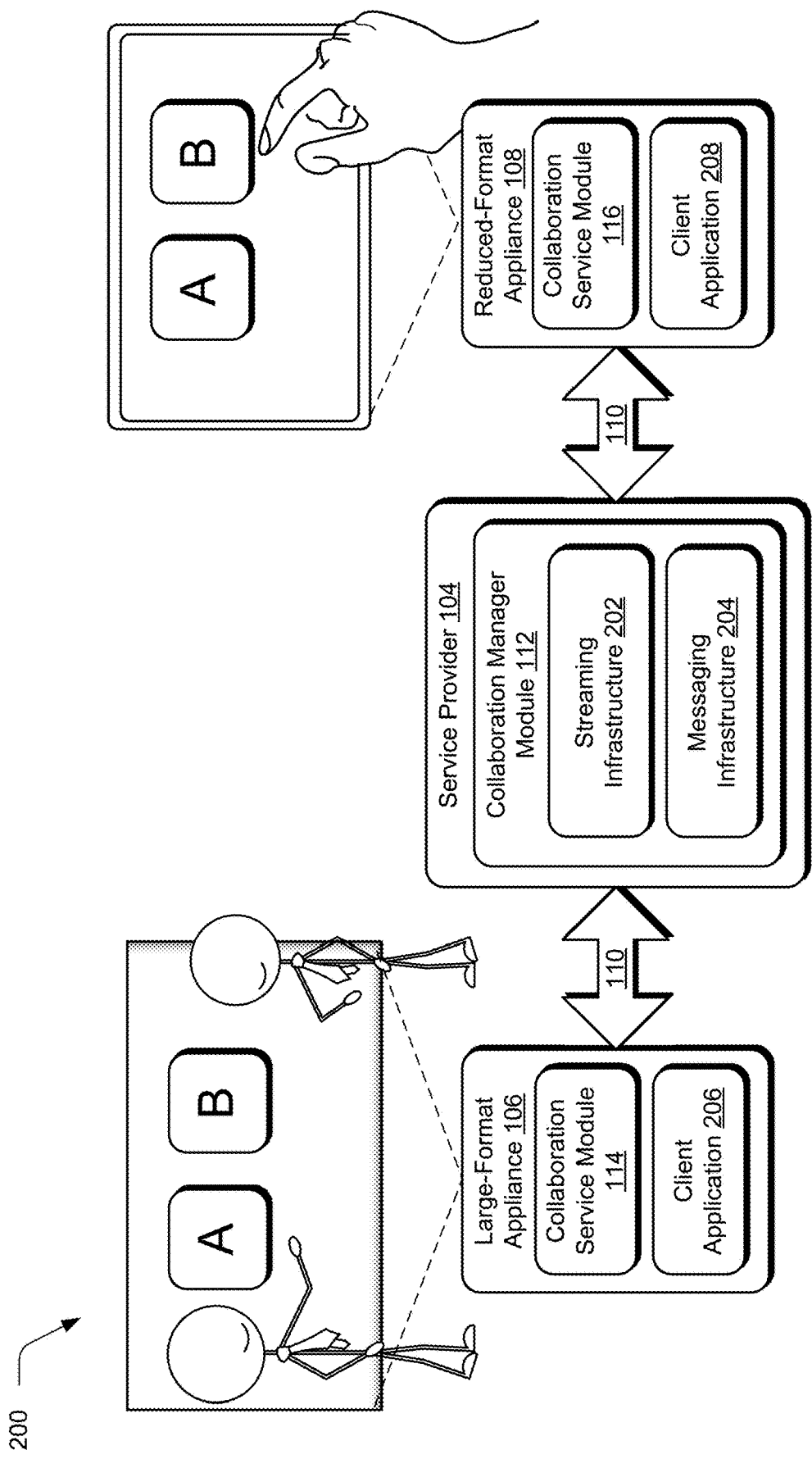
FIG. 2 is a conceptual diagram of a communication infrastructure of the collaboration system of FIG. 1 as sharing content streams across appliances.

FIG. 2 is a conceptual diagram of a communication infrastructure 200 of the collaboration system 100 of FIG. 1 as sharing content streams across appliances, e.g., across the large and reduced format appliances 106, 108 through interaction with the service provider 104. As shown, this communication infrastructure 200 includes, without limitation, the large-format appliance 106 and the reduced-format appliance 108 communicatively coupled to service provider 104 via a network 110. As shown in FIG. 2, communication infrastructure 200 of this example implementation includes streaming infrastructure 202 and messaging infrastructure 204 included as part of the collaboration manager module 112 to support communication of the collaboration service modules 114, 116 to implement the shared workspace.

Large-format appliance 106 is illustrated as sharing a content stream A, via communication infrastructure 200, with the reduced-format appliance 108. In response, reduced-format appliance 108 is configured to retrieve content stream A from communication infrastructure 200 and to display that content stream on a display device of the reduced-format appliance 108 with its content stream B. Likewise, reduced-format appliance 108 is configured to share content stream B, via communication infrastructure 200, with the large-format appliance 106. In response, the large-format appliance 106 is configured to retrieve content stream B from communication infrastructure 200 and to display that content stream on a display device of the large-format appliance 106 with its content stream A.

In this fashion, the large and reduced format appliances 106, 108 are configured to coordinate with one another via the service provider 104 to generate a shared workspace that includes content streams A and B. Content streams A and B may be used to generate different assets rendered within the shared workspace. In one embodiment, each of the large and reduced format appliances 106, 108 perform a similar process to reconstruct the shared workspace, thereby generating a local version of that shared workspace that is similar to other local versions of the shared workspace reconstructed at other appliances. As a general matter, the functionality of the large and reduced format appliances 106, 108 are coordinated by respective collaboration service modules 114, 116 and client applications 206, 208, respectively.

Client applications 206, 208 are software programs that generally reside within a memory (as further described in relation to FIG. 9) associated with the respective appliances. Client applications 206, 208 may be executed by a processing system included within the respective appliances. When executed, client applications 206, 208 set up and manage the shared workspace discussed above in conjunction with FIG. 2, which, again, includes content streams A and B. In one implementation, the shared workspace is defined by metadata that is accessible by both the large and reduced format appliances 106, 108. Each of the large and reduced format appliances 106, 108 may generate a local version of the shared workspace that is substantially synchronized with the other local version, based on that metadata (discussed below in relation to FIG. 3).

In doing so, client application 206 is configured to transmit content stream A to streaming infrastructure 200 for subsequent streaming to the reduced-format appliance 108. Client application 206 also transmits a message to the reduced-format appliance 108, via messaging infrastructure 204, indicating to the large-format appliance 106 that content stream A is available and can be accessed at a location reflected in the message. In like fashion, client application 208 is configured to transmit content stream B to streaming infrastructure 202 for subsequent streaming to the large-format appliance 106. Client application 208 also transmits a message to the large-format appliance 106, via messaging infrastructure 204, indicating to the large-format appliance 106 that content stream B is available and can be accessed at a location reflected in the message. The message indicates that access may occur from a location within streaming infrastructure 202.

Client application 206 may also broadcast a message via messaging infrastructure 204 to the reduced-format appliance 108 that specifies various attributes associated with content stream A that may be used to display content stream A. The attributes may include a location/position, a picture size, an aspect ratio, or a resolution with which to display content stream A on the reduced-format appliance 108, among others, and may be included within metadata described below in relation to FIG. 3. Client application 208 may extract the attributes from messaging infrastructure 204, and then display content stream A at a particular position on a display device of the reduced-format appliance 108, with a specific picture size, aspect ratio, and resolution, as provided by messaging infrastructure 204. Through this technique, the large-format appliance 106 is capable of sharing content stream A with the reduced-format appliance 108. The reduced-format appliance 108 is also configured to perform a complimentary technique in order to share content stream B with the large-format appliance 106.

Client applications 206, 208 are thus configured to perform similar techniques in order to share content streams A and B, respectively with one another. When client application 206 renders content stream A on a display device of the large-format appliance 106 and, also, streams content stream B from streaming infrastructure 202, the large-format appliance 106 thus constructs a version of a shared workspace that includes content stream A and B. Similarly, when client application 208 renders content stream B on a display device of the reduced-format appliance 108 and, also streams content stream A from streaming infrastructure 202, the large-format appliance 106 similarly constructs a version of that shared workspace that includes content streams A and B.

The appliances (e.g., the large and reduced format appliances 106, 108) discussed herein are generally coupled together via streaming infrastructure 202 and messaging infrastructure 204. Each of these different infrastructures may include hardware that is cloud-based and/or co-located on-premises with the various appliances, which are both represented by network 110. However, persons skilled in the art will recognize that a wide variety of different approaches may be implemented to stream content streams and transport messages/messages between display systems.

Figure 3:
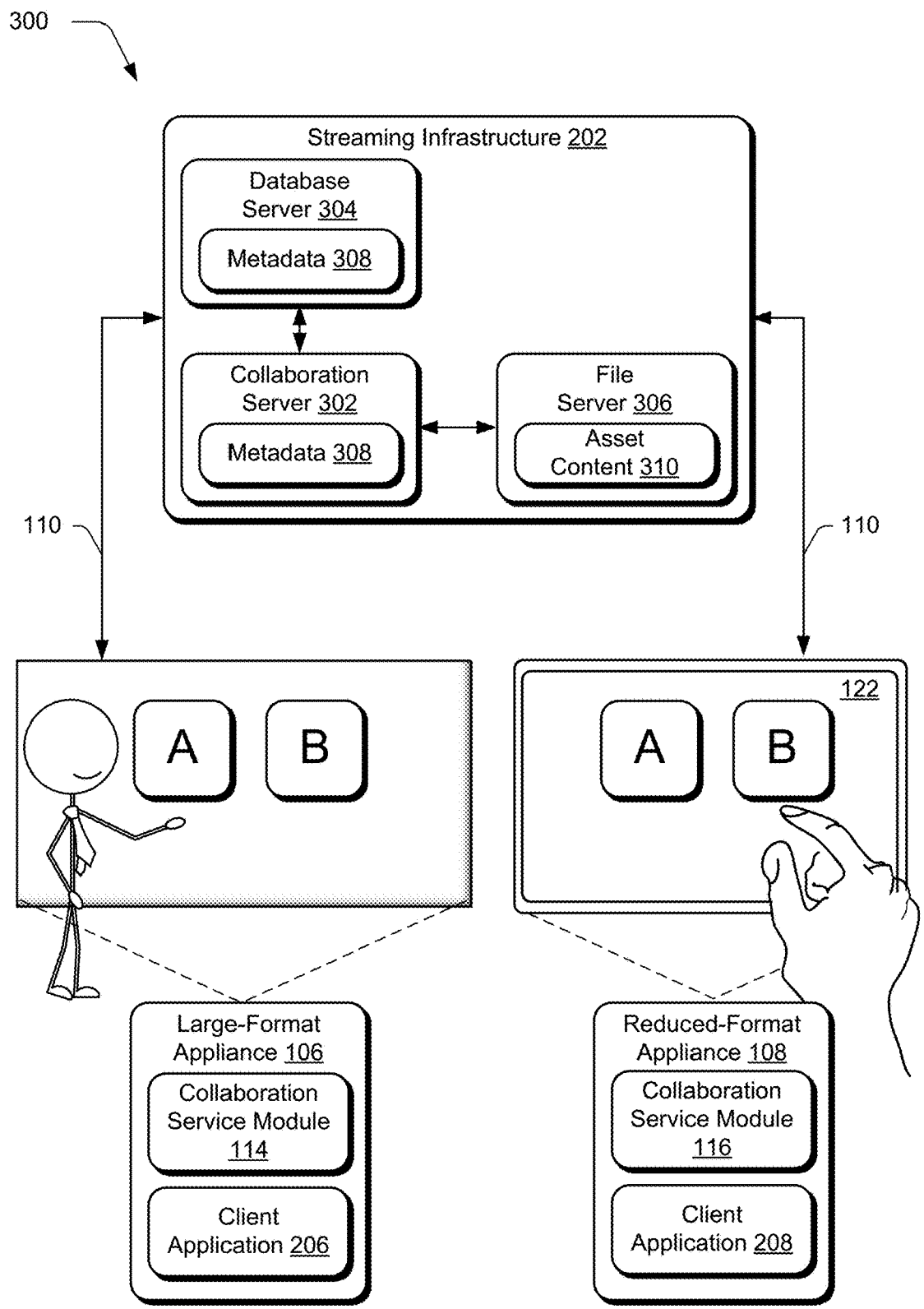
FIG. 3 depicts a streaming infrastructure of FIG. 2 in greater detail.

FIG. 3 depicts a block diagram 300 showing the streaming infrastructure 202 of FIG. 2 in greater detail. Streaming infrastructure 202 in this example includes a collaboration server 302, a database server 304, and a file server 306. Each server may comprise a computer device having a processor (such as processing system unit described in relation to FIG. 9) and a computer-readable medium such as memory, the processor executing software for performing functions and operations described herein. Collaboration server 302, database server 304, and file server 306 may be implemented as shown as separate and distinct computing devices/structures coupled to each other and to the appliances via a network 110. Alternatively, functionality of collaboration server 302, database server 304, and file server 306 may be implemented as a single computing device/structure in a single location, or in any other technically feasible combination of structures. Further, one or more of collaboration server 302, database server 304, and/or file server 306 may be implemented as a distributed computing system. The network 110 may be via any technically feasible communications or information network, wired or wireless, that allows data exchange, such as a wide area network (WAN), a local area network (LAN), a wireless (WiFi) network, and/or the Internet, among others.

Collaboration server 302 coordinates the flow of information between the various appliances (e.g., the large and reduced format appliances 106, 108), database server 304, and file server 306. Thus, in some implementations, collaboration server 302 is a streaming server for the appliances. In some embodiments, the application program interface (API) endpoint for the appliances and/or business logic associated with streaming infrastructure 202 resides in collaboration server 302. In addition, collaboration server 302 receives requests from appliances and can send notifications to the appliances. Therefore, there is generally a two-way connection between collaboration server 302 and each of appliances, e.g., the large and reduced format appliances 106, 108. Alternatively or additionally, appliances may make requests on collaboration server 302 through the API. For example, during collaborative work on a particular project via collaboration system 100, an appliance may send a request to collaboration server 302 for information associated with an asset to display the asset in a shared workspace of the particular project.

Database server 304 (as well as collaboration server 302) may store metadata 308 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc. Metadata 308 may also include aspect ratio metadata and asset metadata for each asset. In some implementations, aspect ratio metadata may include an aspect ratio assigned to the project (referred to herein as the "assigned aspect ratio"). An aspect ratio assigned to a project applies to the shared workspaces of the project so that all shared workspaces of the project have the same aspect ratio assigned to the project. Asset metadata for an asset may specify a location/position and dimensions/size of the asset within an associated shared workspace.

The asset metadata indicates the position and size of an asset, for example, implementing horizontal and vertical (x and y) coordinate values. In some embodiments, the asset metadata may express the position and size of an asset in percentage values. In such implementations, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. Thus, when display surfaces of appliances have different sizes and/or aspect ratios, each asset can still be positioned and sized proportional to the specific shared workspace in which is it being displayed. When multiple display devices of multiple appliances separately display a shared workspace, each may configure the local version of the shared workspace based on the received metadata.

File server 306 is the physical storage location for some or all asset content 310 that are rendered as files, such as documents, images, and videos. In some embodiments, file server 306 can receive requests for asset content 310 directly from appliances. For example, an asset, such as a word-processing document, may be associated with a shared workspace that is displayed on a display device of a plurality of appliances, e.g., the large and reduced format appliances 106, 108. When the asset is modified by a user at the large-format appliance 106, metadata for a file associated with the asset is updated in file server 306 by collaboration server 302, the reduced-format appliance 108 downloads the updated metadata for the file from file server 306, and the asset is then displayed, as updated, on the display surface 124 of the reduced-format appliance 108. Thus, file copies of all assets for a particular shared workspace and project may be stored at the file server 306, as well as stored at each appliance that is collaborating on a project.

Each of the appliances is an instance of a collaborative multi-media platform disposed at a different location in a collaboration system 100. Each collaboration appliance is configured to provide a digital system that can be mirrored at one or more additional and remotely located appliances. Thus, collaboration clients facilitate the collaborative modification of assets, shared workspaces, and/or complete presentations or other projects, as well as the presentation thereof.

Figure 4:
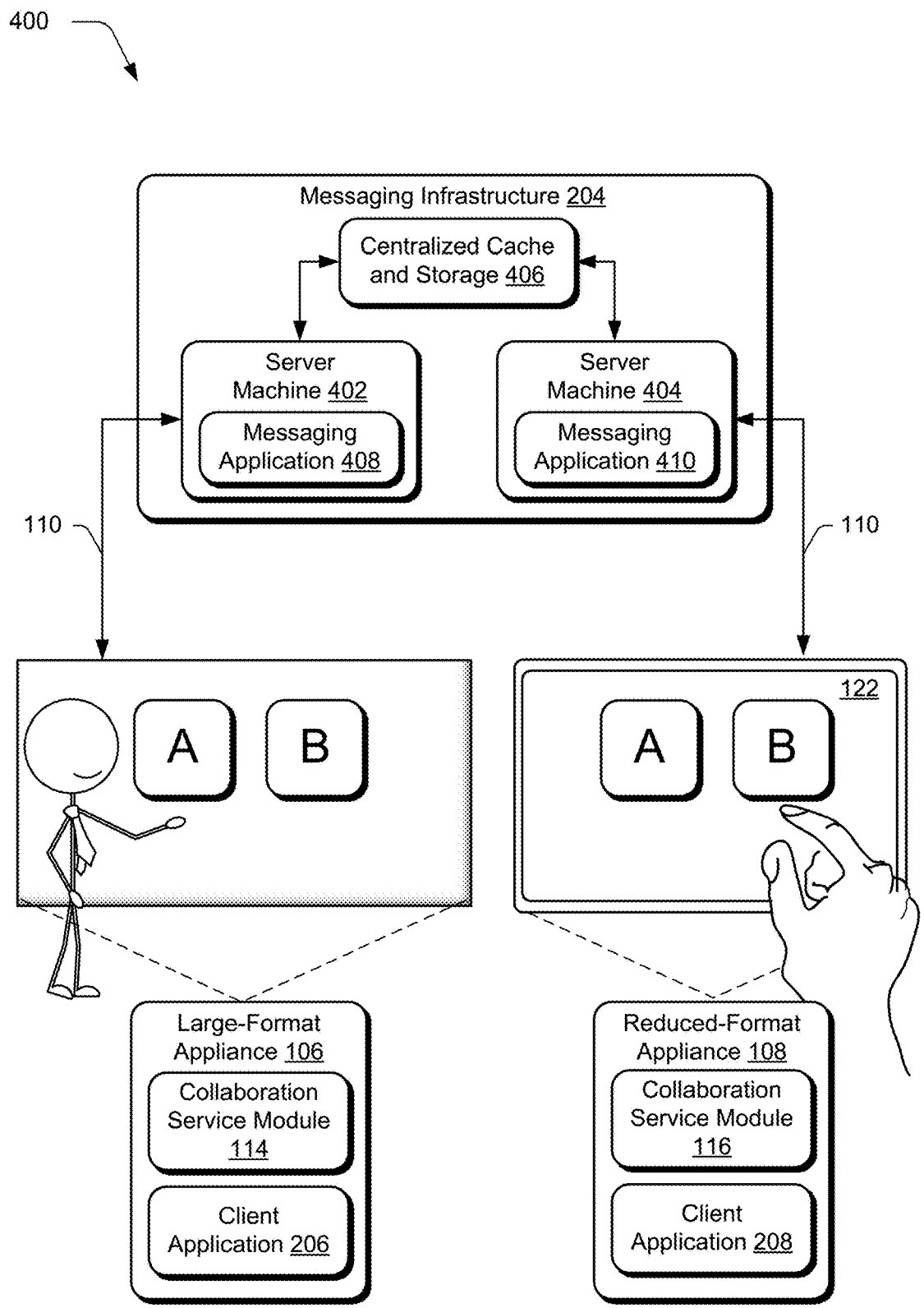
FIG. 4 depicts a messaging infrastructure of FIG. 2 in greater detail.

FIG. 4 depicts the messaging infrastructure 204 of FIG. 2 in greater detail. As shown, messaging infrastructure 204 includes server machines 402 and 404 coupled together via centralized cache and storage 406. Server machine 402 is coupled to the large-format appliance 106 and includes a messaging application 408. Server machine 404 is coupled to the reduced-format appliance 108 and includes a messaging application 410.

Figure 9:
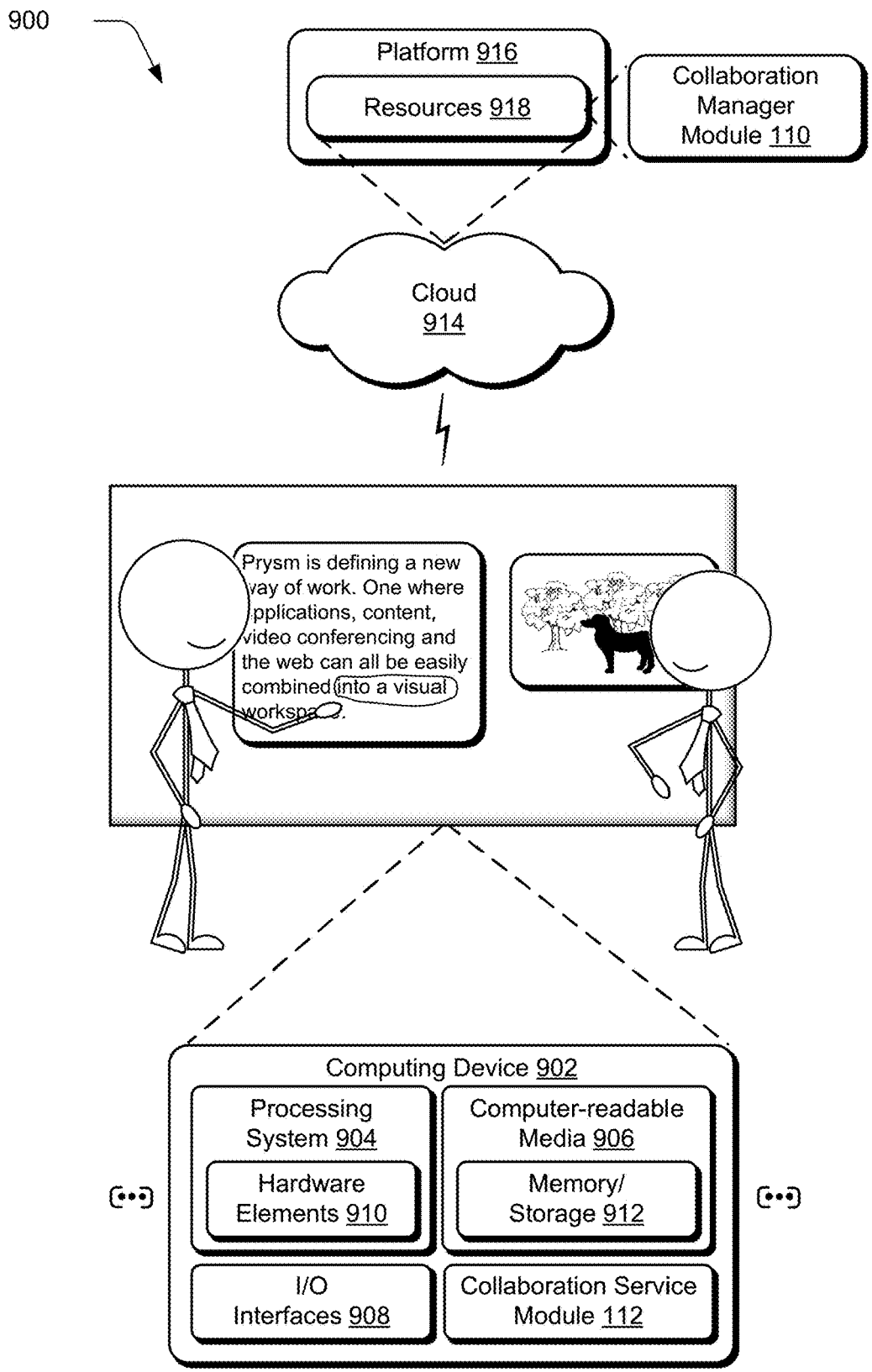
FIG. 9 illustrates an example system including various components of an example device that can be implemented as any type of computing device as described and/or utilize with reference to FIGS. 1-5 to implement embodiments of the techniques described herein.

Server machines 402 and 404 are generally cloud-based or on-premises computing devices that include memory and processing systems as further described in relation to FIG. 9 configured to store and execute messaging applications 408 and 410, respectively. Messaging applications 408 and 410 are configured to generate real-time socket connections with the large and reduced format appliances 106, 108, respectively, to allow messages to be transported quickly between the appliances. In one implementation, messaging applications 408 and 410 are implemented as ASP.NET applications and rely on signalR WebSockets to accomplish fast, real-time messaging.

Centralized cache and storage 406 provides a persistent messaging back-end through which messages can be exchanged between messaging applications 408 and 410. In one embodiment, centralized cache and storage includes a Redis cache backed by a SQL database. Messaging applications 408 and 410 may be configured to periodically poll centralized cache and storage 406 for new messages, thereby allowing messages to be delivered to those applications quickly.

In operation, when the large-format appliance 106 transmits a message indicating that content stream A is available on streaming infrastructure 202, as described above, the large-format appliance 106 transmits that message to messaging application 408. Messaging application 408 may then relay the message to centralized cache and storage 406. Messaging application 410 polls centralized cache and storage 406 periodically, and may thus determine that the message has arrived. Messaging application 410 then relays the message to the reduced-format appliance 108. The reduced-format appliance 108 may then parse the message to retrieve an identifier associated with the large-format appliance 106, and then stream content associated with the large-format appliance 106 from streaming infrastructure 202.

Having considered the above-described shared workspace and supporting infrastructure, consider now how assets can be exposed within a shared workspace.

Exposing Assets within a Shared Workspace

Various embodiments enable one or more appliances to participate in a shared workspace. The shared workspace can include a single appliance, multiple appliances, a single meeting room, multiple meeting rooms, or any combination thereof. The state of various meeting participants can be identified and one or more rules can be applied to the participants' state to provide an outcome. An "outcome" can be thought of as an action that is to be performed responsive to the identified state. An asset interaction control feature can be selected based on the outcome. The asset interaction control feature controls or affects, in some manner, a participant's interaction with one or more assets that are part of the shared workspace. The asset interaction control feature can be applied to at least one of the assets. Alternately or additionally, the asset interaction control feature can be applied to one or more appliance. In one or more embodiments, the asset interaction control feature can be controlled by a local appliance. That is, the local appliance can monitor the state associated with its shared workspace. The local appliance can then apply an asset interaction control feature as appropriate, depending on the state associated with its shared workspace. Alternately or additionally, appliances participating in a shared workspace can monitor the associated state and report the state to a central server. The central server can then analyze the state and provide instructions to the appliances regarding application of the asset interaction control feature. In at least some other embodiments, application of the asset interaction control feature can be distributed between one or more appliances and a central server. That is, some classes of asset interaction control features can be applied by an appliance, while other classes of asset interaction control features can be applied by the central server. In an alternate implementation the central server provides metadata to the one or more appliances identifying the asset with the permission associated with the rights at the one or more appliances. In this alternate implementation, the appliance based on the retrieved metadata applies the appropriate interaction control to the appropriate asset.

As an example, participant meeting room state can include, by way of example and not limitation, individuals entering or leaving a particular meeting room, the number of meeting participants who are participating in a content sharing session by way of the shared workspace, their relative locations within an associated meeting room within which the content sharing session is taking place, individual levels of authorization, or lack thereof, to consume assets being presented within the content sharing session, and the like. Based on identified participant state, rules can be applied to information identified by the system. So, for example, if an individual enters a meeting room who is not authorized to view certain assets, an asset interaction control feature, such as an obfuscation level, can be applied to certain assets to ensure that the individual cannot view or otherwise consume the assets. An "obfuscation level" refers to a particular obfuscation type that can be selected and applied to an asset such as blurring an asset, redacting portions of an asset, blacking out an asset and the like. This can, in turn, enhance the security, privacy, and confidentiality of the meeting and the assets exposed during the course of the meeting. Conversely all assets may be considered confidential at any local meeting room site and only when an individual enters the local meeting room who is authorized to view certain assets an asset interaction control feature, such as an enabler level, can be applied to certain assets to ensure that the individual can view or otherwise consume the assets.

Figure 5:
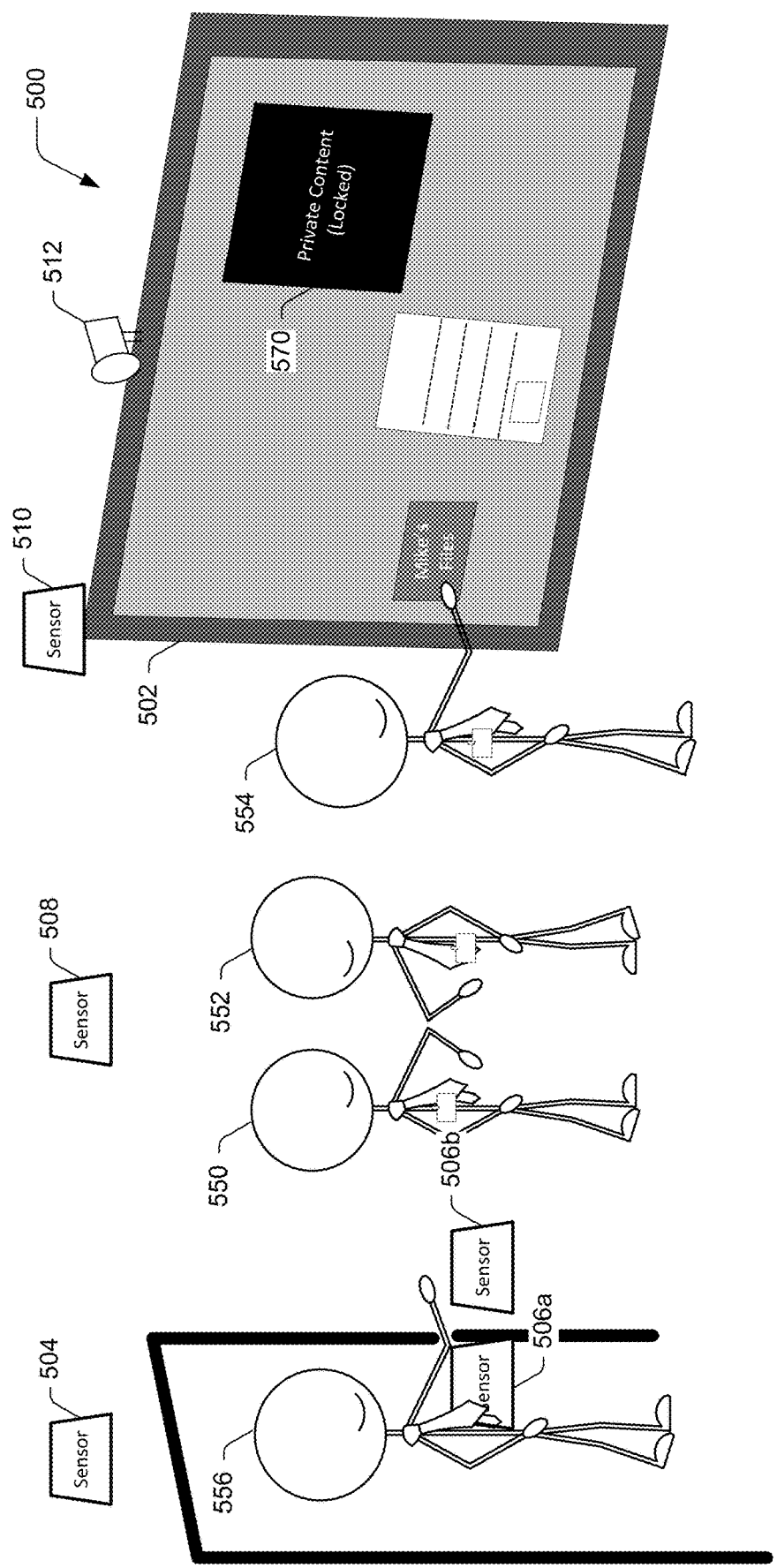
FIG. 5 depicts an example meeting room in accordance with one or more embodiments.

As an example, consider FIG. 5 which illustrates a meeting room environment 500 including a large-format appliance 502 having a display that can display various assets as part of a shared workspace. In at least some embodiments, various devices are positioned proximate or around the meeting room and enable information to be gathered with respect to the state of the meeting, such as identifying individual meeting participants' state. The devices can include various sensors 504, 506a (just outside the meeting room), 506b (just inside the meeting room), 508, and 510, as well as one or more cameras 512.

The devices can be used for detecting participants in the meeting room, detecting participants entering and leaving the meeting room, counting participants, identifying participants, authenticating meeting participants, and the like. The devices can also have other uses such as, more generally, detecting various states associated with a meeting or meeting room, such as time of day (e.g., certain times of day may be designated for confidential meetings). To this end, the devices can include, by way of example and not limitation, RFID readers, cell phone proximity devices, clocks, Bluetooth devices, image sensors, motion sensors, biometric sensors such as room retinal readers and fingerprint scanners, sonic sensors, microphones, asset event sensors that can sense or detect asset state (e.g., changing asset states, asset interaction by a meeting participant), room event sensors (e.g., door opened or closed, window shades opened or closed, switchable glass on or off, video input/output), and the like.

In this particular example, the meeting room includes four participants 550, 552, 554, and 556. Each of the participants 550, 552, and 554 is wearing a security badge which authorizes them to attend the content sharing session taking place in the meeting room. Participant 556, on the other hand, is not wearing a security badge. Accordingly, participant 556 is not authorized to attend the content sharing session taking place in the meeting room.

The devices positioned around the room enable the system to determine the number of individuals who are present at a particular content sharing session. In this particular example, prior to participant 556 entering the room, the system would know that three participants are taking part in the content sharing session. As soon as participant 556 approaches the room or enters the room, sensor 504 and/or sensors 506a and 506b can ascertain that a new participant has entered the room. For example, sensor 504 may be an RFID sensor that is configured to detect security badges that are worn by participants who enter the room. Sensors 506a and 506b may be infrared sensors that detect that a participant has entered the room—by first detecting the participant with sensor 506a and then sensor 506b once the participant has entered the room. By virtue of sensors 506a and 506b detecting that a participant has entered the room, and the fact that sensor 504 did not detect a security badge, the system can ascertain a new state associated with the content sharing session and can take any appropriate steps in view of the new participant, such as implementing an asset interaction control feature either locally, or through instructions that are received from a central server responsive to reporting the new state to the central server.

For example, in a single meeting room scenario, an individual who is not authorized to view certain assets may enter the meeting room, such as participant 556. Once the system identifies that this new individual is not authorized to view certain assets, the system can implement an asset interaction control feature by automatically obfuscating the assets that are not authorized to be viewed by the new individual. Alternately or additionally, the system may replace an asset with an alternate asset that is deemed acceptable for the given participant. For example, an acceptable replacement asset may be one in which content has been redacted. Obfuscation can include, by way of example and not limitation, visually obscuring, blurring, iconizing or hiding an asset (such as asset 570 which has been blacked out), audibly masking an asset that has an audible component, both visually and audibly obscuring an asset, and the like. Other asset interaction control features can include asset access control, such as allowing or denying access to files such as personal files or providing a visual notification on a display that sharing is not permitted for a particular asset, and the like. That is, asset interaction control features can also be applied to one or more appliances such as, by way of example and not limitation, controlling access to assets that are accessible by way of an appliance, causing a notification to be displayed by the appliance or, more accurately, the appliance's display device and the like.

In some instances, asset interaction control features can include providing an enhancement level that is utilized to enhance an asset. For example, an individual meeting participant may be color blind and this information can be included in the individual's user profile. If the system detects that the individual is in close proximity to the display, the system might render an asset or a portion of an asset in a more user-friendly color for the color blind individual.

In embodiments in which a content sharing session takes place in different meeting rooms with different collections of participants, the same approach can be used to ensure that assets are protected from being exposed or determining how the assets are rendered to participants who are otherwise unauthorized to consume the assets, distinct for each meeting room. For example, if two meeting rooms are being employed in a content sharing session and an unauthorized individual enters a first of the meeting rooms, once the unauthorized individual is identified, content that is being shared from a second of the meeting rooms to the first meeting room can be obfuscated in the first meeting room so that the unauthorized individual cannot consume the content. An example of how this can be done is provided below.

Alternately or additionally, the same content can be obfuscated in the second meeting room as well, to ensure that the content may not be inadvertently shared outside of the meeting room software and hardware, e.g., by a meeting participant taking a picture of the content and forwarding it to the unauthorized individual. Alternately, in some meeting room states, meeting room cameras may receive signals disabling image capture to prevent unauthorized dissemination of information. In some instances, a first participant associated with a first appliance may cause a first asset to have a first obfuscation level applied to the first asset on the first appliance, and a second participant associated with a second appliance may cause a second asset to have a second obfuscation level applied to the second asset on the second appliance. The first and second appliances may be in the same meeting room or different meeting rooms.

In addition to sensing or detecting the number of participants in a particular meeting room, the devices positioned around the room can ascertain other meeting-related contexts. For example, the devices can ascertain who the particular participants are based on things such as security badge identification, facial recognition by way of images captured by camera 512, voice detection pattern recognition, RFID employee badges, visitor badges, and portable device such as a phone or laptop that transmits identifier information which can include location within the room, and the like. Further contexts can include where particular participants are located in the meeting room, proximity to the large-format appliance's display, whether a participant is standing or sitting, which participant or participants are actively engaging the display (e.g., participant 554) such as by interacting with the display, touching the display, and the like. All of these things, as well as others can contribute to the meeting participant state.

Once the system ascertains the meeting participant state and/or meeting room state, an intelligent decision can be made on which asset interaction control features are utilized to control how assets are exposed and treated within the content sharing session. Again, asset interaction control features can be locally applied by an appliance on its own, or can be applied by way of instructions received from a central server responsive to receiving state information regarding a meeting room state. For example, when meeting participant 554 approaches and engages the display, the system knows that the meeting participant is "Mike" and, as such, can utilize an asset interaction control feature to automatically enable Mike to access his private files. When another user approaches the display and Mike leaves the display, the other user's private files can be automatically exposed to the other user, while Mike's files can be hidden or otherwise made unavailable.

Having considered how assets can be exposed within a shared workspace, consider now the various aspects associated with asset security levels and permissions that can be used to define, in a rule-based system, how assets are exposed and which assets are exposed depending on meeting participant state and/or meeting room state.

In one or more embodiments, security levels or permissions can be associated with various aspects of a content sharing session. For example, security levels or permissions can be associated with assets, file systems, and database systems.

Assets with Security Levels

With respect to assets, consider the following. Within any particular content sharing session, security levels can be associated with individual files and annotations that might appear on content that is rendered on a display. For example, an individual file having a particular security level might be shared amongst a collaborative group at different meeting locations. The file may have content that is rendered on each display. An individual meeting participant may approach a display and make an annotation on the content. This annotation may or may not change the security level of the content. In some instances, different regions of the display screen may have different security levels. For example, the top right quadrant of the display may be reserved for content with only the highest security level. The other three quadrants of the display may have varying security levels or may be allocated for all other content. So, when an individual places an asset in the top right quadrant, even though the asset itself may not have an associated security level, by virtue of being placed in the top right quadrant, the asset is now assigned a corresponding security level and the system can check to ascertain whether all meeting participants are cleared to consume the asset. In addition, various applications that might be utilized within a particular content sharing session may have different security levels. So, for example, one application may have a high security level and another application may have a low security level. Before the application with the high security level is launched, the system can ascertain whether the individual meeting participants are authorized to view the content of the application.

In other instances, conference rooms, sites, and devices may have their own associated security levels. Thus, a conference room with a high security level would not be an appropriate meeting location for individuals with only a low security clearance. In this instance, the system can ascertain that one or more individuals do not qualify to participate in a meeting held in a particular high security level conference room.

In some embodiments, the security level of an asset can be modified based on who provides an annotation on the asset. For example, an individual may be designated as a high-security individual such that any annotations they make on a particular asset automatically change the asset's security level to a high level. Further, chat transcripts, webpages, and metadata tied to assets can have security levels that are relevant to a determination of how content is exposed within a content sharing session.

File Systems with Security Levels

In one or more embodiments, file systems can have security levels that determine how file content is exposed within a content sharing session. Security levels can be file based in that each individual file carries its own security level. Alternately or additionally, file systems may be user-based, group-based, or project-based. Thus, a user-based file system may grant access to individual users having a certain security level or higher. Similarly, individual participants may belong to a group such that the file system is a group-based file system. In this manner, only groups with a certain security level or higher can be given access to the file system. Similarly, a file system may be project-based such that files within the system are accessible only for a particular project and no others and only to the authorized participants of the particular project.

Database Systems with Security Levels

In one or more embodiments, database systems can have security levels that determine how content is exposed within a content sharing session. That is, database security levels can be based on database source business office, source database storage location, and individual files based on catalogued subject.

System Tracking

As discussed above, the system can track a number of different parameters in order to ascertain how and whether to expose certain assets in a content sharing session. These parameters can include conference room-based parameters such as resources being utilized within the conference room and conference room security level, conference room state (e.g. door open/closed, curtains open/closed, and the like), who is currently in the collaboration, time of day, temporarily-granted permission, personal device-based parameters (as another indication of the identity of a participant), whether an asset is preloaded and visible, meeting type-based and the like.

With respect to conference room-based parameters and conference room security level, consider the following. In some instances, a conference room may carry with it an assigned security level. For example, in various government and military scenarios, a conference room may have security measures and infrastructure instituted to provide a level of security for meetings that occur within. These measures and infrastructure can include such things as insulation to prevent sound from carrying outside the room, electronic countermeasures to provide security from unwanted audio or video surveillance, and the like. Thus, because of the conference room security level, the conference room can be cleared to disclose certain kinds of sensitive assets. In these instances, if an asset is attempted to be shared that has a security level that is higher than that of the conference room, an asset may be obfuscated within that particular conference room.

With respect to conference room state, consider the following. In some instances, the conference or meeting room can be monitored to ascertain its current state. The current state of a particular conference room can refer to any state that may affect the disclosure of assets that take place within a content sharing session. For example, the conference room may have curtains or blinds on the windows. When the curtains or blinds are open, someone from outside of the conference room may be able to see into the room and ascertain content displayed on a display. In this instance, one or more cameras or other sensor devices within the room can detect that the curtains or blinds are open and, accordingly, any sensitive assets that might be displayed can be obfuscated. When the curtains or blinds are closed, the system can ascertain that the conference room state has changed and, accordingly, can un-obfuscate the assets.

With respect to who is currently in the collaboration, consider the following. As noted above, the system can track individual meeting participants based upon their identity and whether they are in the conference room, nearing the conference room, leaving the conference room, entering the conference room, moving about within the conference room, approaching a display in the conference room, and the like. Based on these state changes within the conference room, the system can make intelligent decisions with respect to exposing assets during the content sharing session.

With respect to time of day, consider the following. As an example, a meeting room may, for certain designated times of day, be scheduled for executive only meetings or confidential only meetings. For example, Monday mornings between 8 a.m. and noon, a meeting room may be designated for confidential only meetings. Based on the state change associated with the time of day, the system can make intelligent decisions with respect to exposing assets during the content sharing session.

With respect to temporarily granted permission, consider the following. In some instances, an individual meeting participant may not have the required credentials to view one or more assets that are to be rendered on a display. However, a person of authority who is running the meeting may have the authority to temporarily grant access to an individual. In this instance, the person of authority can approve the un-credentialed person and clear them for access for a particular meeting or for individual assets that are displayed within a particular meeting. In this manner, assets will not be obfuscated notwithstanding the fact that a person without credentials to view the assets is present in the meeting room.

With respect to personal device-based parameters, consider the following. Personal computing devices such as laptops, tablets, cell phones, and the like are typically registered to an individual. Information associated with an individual or owner can reside on such devices. This information can include the individual's name, and other information such as clearance level and the like. In some instances, this information can be automatically conveyed to the system so that the system can use this information to further identify individuals who are present within a meeting room. By doing so, the system can make intelligent decisions on how to expose assets within a content sharing session.

With respect to whether an asset is preloaded and visible, consider the following. During the course of a content sharing session, assets can be displayed on a display within the meeting room as described above. Metadata of the asset on, for example, a user's local device, can be communicated to the content collaboration system so that its security level can be ascertained. When a person enters a meeting room, the system can identify that a new person has entered the room and can make an intelligent decision on whether to continue to display the particular asset. For example, if the system identifies that the person who just entered the meeting room is not cleared for a particular asset or, alternatively, is unable to ascertain whether the person is cleared, the system may obfuscate the asset until a resolution can be reached as to whether the person is cleared for the asset.

With respect to meeting type-based parameters, consider the following. In some instances, a meeting may carry with it a declaration or security level regardless of the assets that are exposed within the meeting. For example, the meeting may have a top level security rating even though assets having a lower security level are exposed. In this instance, if an individual joins a meeting and that individual is not cleared for the top level security rating, any or all of the assets in the meeting can be obfuscated until a resolution can be achieved. In some instances, a resolution may involve granting temporary permission for the individual to participate in the meeting. In other instances, the resolution may involve removing the individual who entered the meeting.

Having considered various system tracking parameters, consider now various authenticating mechanisms that can be used to ascertain clearance levels of individuals participating in a meeting.

Authenticating Mechanisms

As noted above, various authenticating mechanisms can be utilized to ascertain clearance levels of participants in a particular content sharing session. These authenticating mechanisms can include, by way of example and not limitation, devices such as RFID readers, cell phone proximity sensors, image sensors, motion sensors, room retinal readers and other biometric sensors, room fingerprint readers, sonic sensors, and the like.

In addition, other authenticating mechanisms can be used such as meeting participant count limit and room security rating. For example, if a meeting or meeting room is expected to have a certain number of attendees, and a number of attendees greater or less than a particular threshold are noticed, the system may question the integrity of the attendee information. In addition, if a security meeting is scheduled for a room that is not set up for such security level, the system may prevent the meeting from happening or advise the host or participants accordingly.

In some instances, other authenticating mechanisms can be used including, by way of example and not limitation, user device IP address, user device login, unique conference login, and unique workspace login.

Having considered various authenticating mechanisms, consider now various asset events that can be monitored by the system to ascertain whether and how to expose or continue to expose assets within a content sharing session.

Asset Events

During the course of a meeting, an asset state may change which, in turn, may affect whether and how the asset is exposed or continued to be exposed. As an example, consider the following.

During the course of the meeting, a meeting participant with a particular security clearance may affect the asset in some way. This can occur in any suitable way. For example, the meeting participant may comment on the asset or describe it in some particular way, change the content of the asset in some manner, add content to the asset, remove content from the asset, and the like. By virtue of having the particular security clearance, the meeting participant's interaction with the asset may cause the asset's security level to be raised. This, in turn, can affect whether the asset is obfuscated or not. For example, there may be some meeting participants who are not cleared for the now-modified asset. In this case, the asset can be obfuscated until the situation can be resolved.

In other instances, the system can generally monitor to ascertain whether an asset is changed or annotated and, accordingly, can make intelligent decisions to expose the asset or continue to expose the asset. Alternately or additionally, an asset may have its security clearance deliberately changed by a meeting participant. In this case, the system can continue to track the asset and make intelligent decisions on whether and how to expose the asset. Alternately or additionally, an asset having one clearance level may have another asset attached to it or otherwise associated with it. The other asset may carry a different clearance level which, in turn, affects how the first asset is exposed. Further, a meeting room may expect a dongle to be present to authenticate the room as being for a particular meeting. The absence of the dongle may prevent the meeting from collaborating in that room.

Having considered the notion of exposing assets within a shared workspace, consider now an implementation example that includes multiple different meeting locations participating in a content sharing session.

Implementation Example

Figure 6:
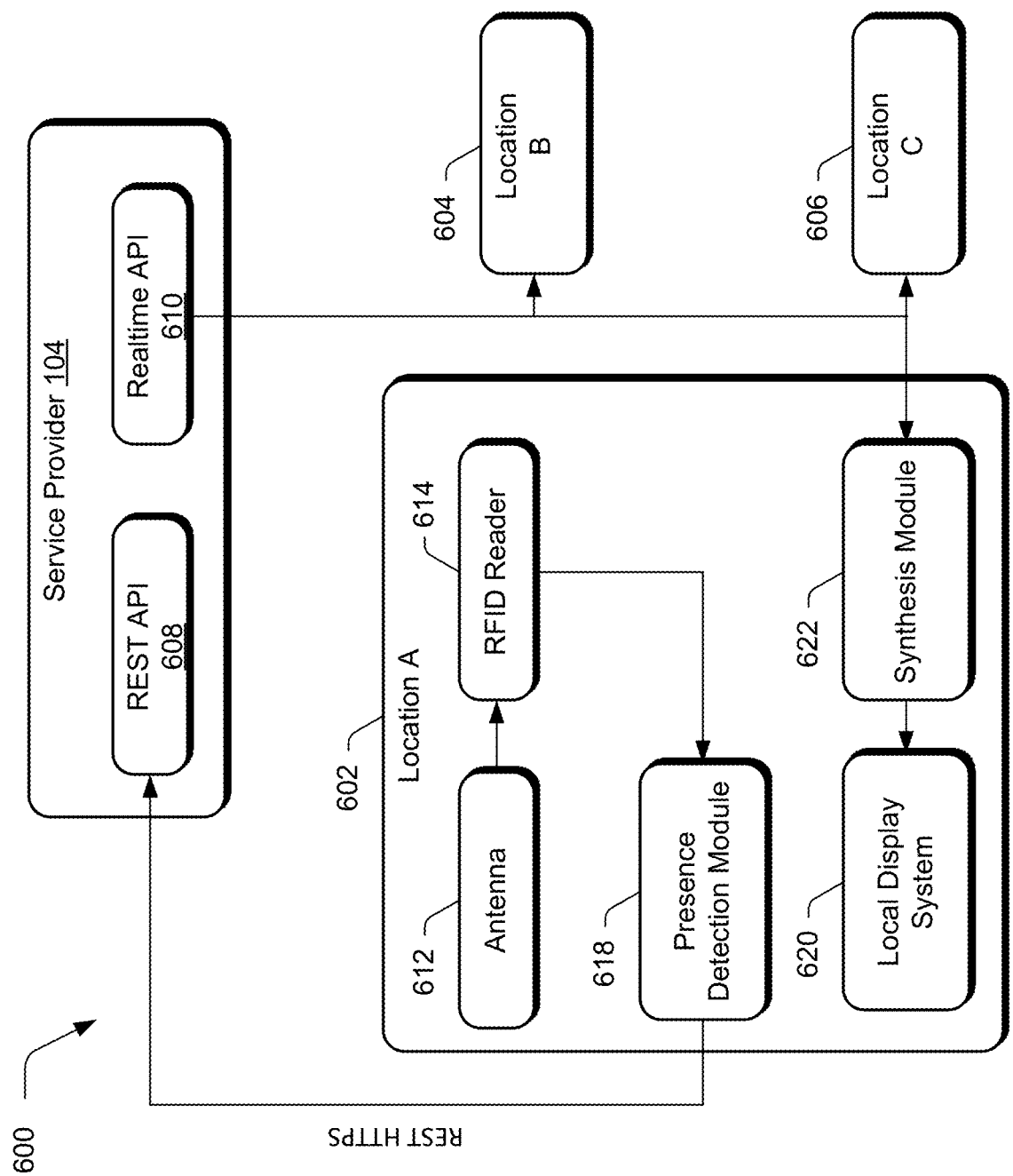
FIG. 6 depicts an example system in accordance with one or more embodiments.

FIG. 6 illustrates an example environment, generally at 600, that includes a service provider 104 and multiple different locations 602, 604, and 606—here, designated as Location A, Location B, and Location C respectively. Each location can have a large-format appliance, such as that described above. Alternately or additionally, individual locations can include one or more reduced-format appliances such as those described above. In the illustrated and described embodiment, service provider 104 can include the functionality described above, particularly with respect to FIG. 2.

Service provider 104, in this particular example, includes a representational state transfer (REST) API module 608 that each of the locations can use to communicate with the service provider 104. In addition, the service provider includes a real-time API module 610 that can be used to communicate with each of the locations as indicated.

In this example, location 602 includes a number of different devices or sensors such as those described above. Specifically illustrated, and for the sake of brevity, is one such sensor in the form of an antenna 612 and corresponding RFID reader or readers 614. Within any particular meeting room associated with a location, one RFID reader may be positioned outside the meeting room, and one RFID reader may be positioned inside the meeting room. This can enable the RFID readers to ascertain whether participants are entering or leaving a particular meeting room. For example, if the RFID reader outside the meeting room first detects a participant and then the RFID reader inside the meeting room then detects the participant, the participant is likely entering the meeting room. The opposite is true. Specifically, if the RFID reader inside the meeting room first detects a participant and then the RFID reader outside the meeting room detects the same participant, the participant is likely leaving the meeting room.

Location 602 also includes a presence detection module 618 which is used to communicate presence information received from RFID reader 614 (as well as information received from other devices) to the service provider 104 by way of REST HTTPS communication. Location 602 also includes a local display system 620 and a synthesis module 622. The synthesis module receives information communicated by service provider 104 by way of real-time API module 610.

In operation, and in this particular specific example, the RFID reader 614 monitors who is entering and leaving a particular room, as described above. For example, an individual meeting participant may wear an RFID badge. As a participant passes a corresponding antenna 612, the antenna detects the RFID badge and RFID reader is able to ascertain a user ID. This information is conveyed to the presence detection module 618 which, in turn, communicates this information to the service provider 104 via the REST API module 608. The service provider 104 processes this information and then conveys information to each of the locations by way of real-time API module 610. For example, in the illustrated example, real-time API module 610 communicates this information to synthesis module 622 at location 602. This information can also be communicated to synthesis modules that reside at locations 604, 606.

In the illustrated and described embodiment, the synthesis module 622 constitutes endpoint software that can include a display dashboard that shows who is currently in the meeting. Such can be displayed on the local display system 620. This can enable the system to keep track of participants who walked into and out of a particular meeting room. For example, individuals leaving or entering each of the different locations can be indicated on a display at each of the locations. So, for example, an individual leaving location B can be indicated on a display at each of the three locations. The display at each location can also indicate who is actively participating in a particular meeting such as those individuals who are logged on via a mobile device and the like.

As indicated above, information regarding meeting participants arriving and leaving a particular meeting room is communicated to the service provider 104 by way of the REST API module 608. This information, in turn, is conveyed to each of the locations by way of real-time API module 610. The real-time API module 610 notifies the synthesis module 622 so that the synthesis module can take the appropriate steps to indicate the presence of the individuals in the meeting room.

In the illustrated and described example, the REST API module 608 and the real-time API module 610 may be part of the same application. The real-time API module 610 provides push notifications to the synthesis clients, i.e. synthesis module 622, so that rather than having the clients poll for participant information, the real-time API module 610 pushes messages to the clients automatically. This information can then be used by the clients to update the display user interface and/or to take other steps such as obfuscating assets as described above.

In one or more embodiments, decisions with respect to obfuscating assets can be made by the service provider 104 based on information that the service provider receives from the different locations. Specifically, the service provider 104 can receive any suitable type of information from various locations. In the present example, such information concerns participants who enter and leave a particular meeting room. As will be appreciated by the skilled artisan, this information can include a wide variety of information associated with the state of a meeting, the state of meeting participants, and the like. Various numerous examples of the types of information pertaining to the meeting are given above. Based on this information, the service provider 104 can apply a set of rules to the information to make a decision with respect to the current state of the meeting. For example, if a particular person enters a meeting location and is not authorized to view certain information that is being presented, notifications can be generated and sent, by way of real-time API module 610, to the particular location that one or more of the assets is to be obfuscated.

That is, once knowledge has been developed with respect to the meeting room state, meeting room events, participant state, and the like, content can be displayed or obfuscated, or other decisions can be made with respect to how the meeting is to be conducted at one or more of the locations. So, for example, if some proprietary information is currently being displayed at one location and only one team, location, or person has permission to see this information, the information can be added to a workspace but is only visible to the one team, location, or at the meeting location where that one person who can view the information is located. Otherwise, the proprietary information can be obfuscated at other locations.

In at least some embodiments, each asset may have a set of rules associated with the asset. The set of rules can define permissions associated with the asset. For example, rules might include such things as:

asset is only visible when author is present;
asset is only visible when a team member of the author is present;
asset is only visible when individuals with access to an associated project are present;
asset is only visible when at least one person with access to the project is present.

Accordingly, a project can include a plurality of assets that each have a set of permissions associated with them that indicate who has access and when such access is to be granted. These rules can be implemented and executed by service provider 104 in the manner described above. These rules can also be executed and implemented by computing devices at each of the locations as appropriate. So, whenever an individual enters a particular location, that individual's credentials can be matched against a security profile on an asset per asset basis. If there is a mismatch, the asset in question at the location can be obfuscated.

Having described an implementation example, consider now example procedures in accordance with one or more embodiments.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 7:
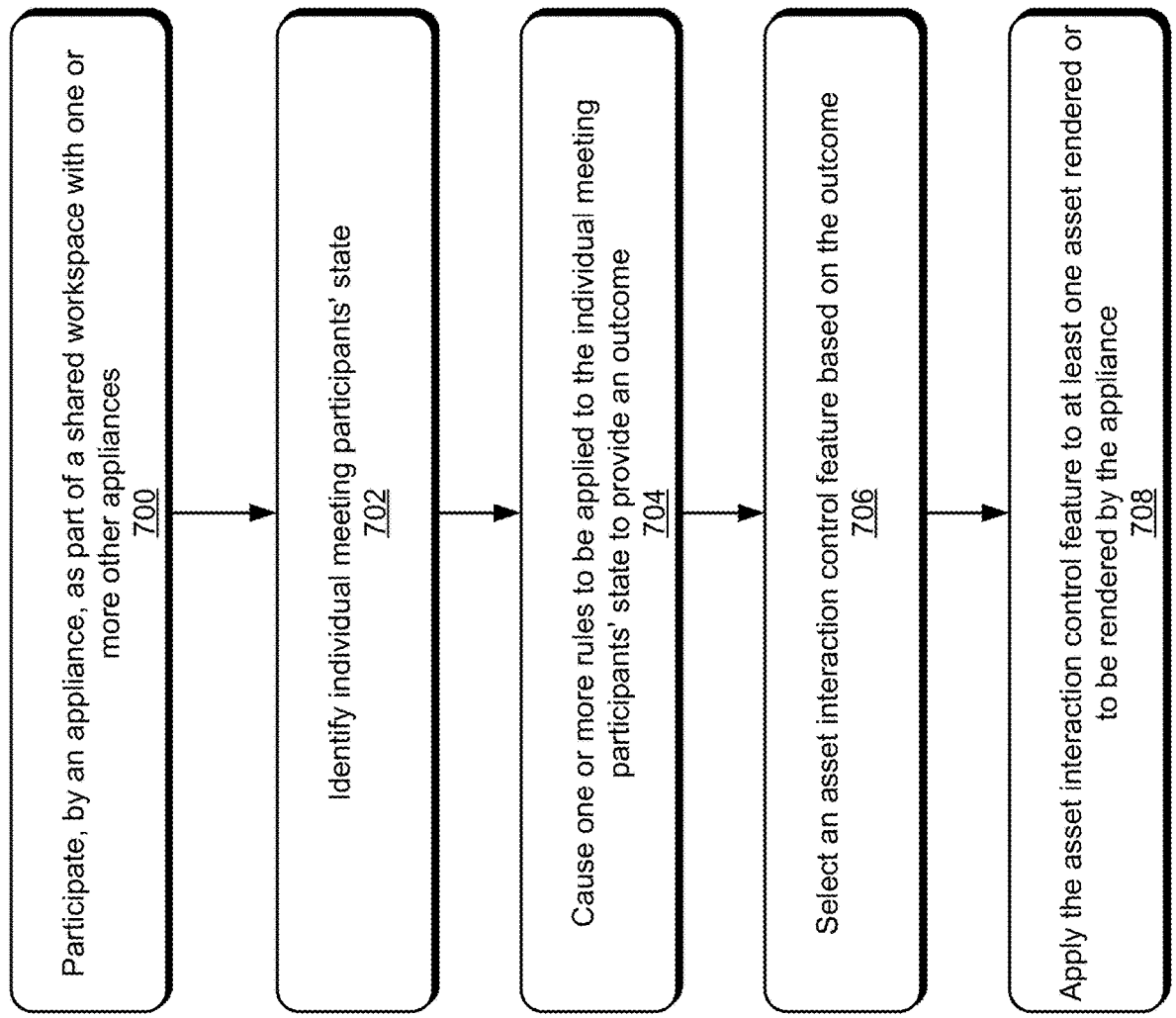
FIG. 7 depicts a procedure in an example implementation in which an asset interaction control feature can be applied to an asset in accordance with one or more embodiments.

FIG. 7 depicts a procedure in an example implementation in which various assets that are part of a shared workspace can be obfuscated based on participant state of an individual meeting in accordance with one or more embodiments.

At block 700, an appliance participates as part of a shared workspace with one or more other appliances. Examples of how this can be done are provided above, particularly with respect to FIGS. 1-6 and the related description. Participation can take place via one or more networks that enable the appliance to share assets with the other appliances as described above. The appliances that are part of the shared workspace can constitute large-format appliances, reduced-format appliances, or combinations of both. Individual meeting participants' state is identified (block 702). The meeting participants' state can refer to any particular state of any particular meeting participant including, by way of example and not limitation, whether a meeting participant has entered or left an associated meeting room, a meeting participant's proximity to the meeting room, the meeting participant's location within a meeting room that includes the appliance or another meeting room that does not include the appliance, the meeting participant's proximity to a display device, whether the meeting participant is touch-engaging the display, and the like. This step can be performed in any suitable way. For example, in at least some embodiments, meeting participants' state can be identified by using one or more sensors associated with the shared workspace. Examples of sensors and sensing devices are provided above.

Block 704 causes one or more rules to be applied to the individual meeting participants' state, as identified at block 702, to provide an outcome (block 704). An "outcome" refers to an action that is to be performed based on application of the rules to the meeting participants' state. This step can be performed in any suitable way. For example, in at least some embodiments, the appliance itself can cause the rules to be applied to the individual meeting participants' state. In other embodiments, the meeting participants' state can be conveyed to a central server which, in turn, can apply the rules to the participants' state. Based on the outcome, the central server can then communicate to the appliance.

An asset interaction control feature is selected, at block 706, based on the outcome. Examples of asset interaction control features are provided above. Such features control the manner in which individuals are able to interact with assets. Such features can include obfuscating certain assets as well as features other than asset obfuscation, such as access control and the like. So, in this example, the outcome based on application of the rules may be that an individual meeting participant is to be given automatic access to their private files because they have touch-engaged the meeting room's display.

At block 708, the asset interaction control feature is applied to at least one asset that is rendered by the appliance or is to be rendered by the appliance. Examples of how this can be done are provided above.

In various embodiments, rules can be constructed to cover any number of scenarios such as rules that pertain to security levels that govern participant access to assets within the shared workspace, permission rules that cover how and when individual participants can interact with assets, privacy concerns, and the like.

Figure 8:
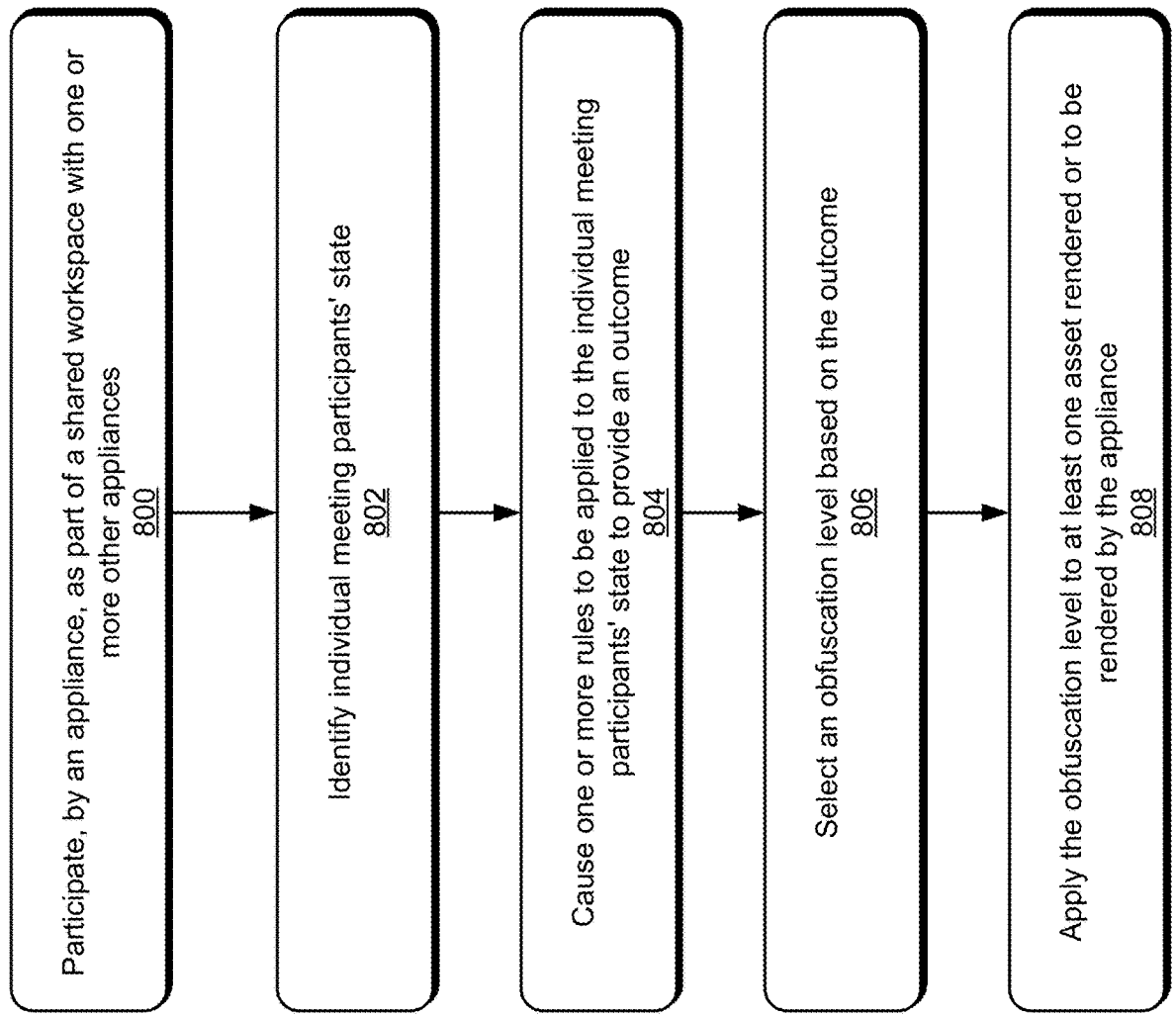
FIG. 8 depicts a procedure in an example implementation in which an obfuscation level can be applied to an asset in accordance with one or more embodiments.

FIG. 8 depicts a procedure in an example implementation in which various assets that are part of a shared workspace can be obfuscated based on participant state of an individual meeting in accordance with one or more embodiments.

At block 800, an appliance participates as part of a shared workspace with one or more other appliances. Examples of how this can be done are provided above, particularly with respect to FIGS. 1-6 and the related description. Participation can take place via one or more networks that enable the appliance to share assets with the other appliances as described above. The appliances that are part of the shared workspace can constitute large-format appliances, reduced-format appliances, or combinations of both. Individual meeting participants' state is identified (block 802). The meeting participants' state can refer to any particular state of any particular meeting participant including, by way of example and not limitation, whether a meeting participant has entered or left an associated meeting room, a meeting participant's proximity to the meeting room, the meeting participant's location within a meeting room that includes the appliance or another meeting room that does not include the appliance, the meeting participant's proximity to a display device, whether the meeting participant is touch-engaging the display, and the like. This step can be performed in any suitable way. For example, in at least some embodiments, meeting participants' state can be identified by using one or more sensors associated with the shared workspace. Examples of sensors and sensing devices are provided above.

Block 804 causes one or more rules to be applied to the individual meeting participants' state, as identified at block 802, to provide an outcome (block 804). An "outcome" refers to an action that is to be performed based on application of the rules to the meeting participants' state. This step can be performed in any suitable way. For example, in at least some embodiments, the appliance itself can cause the rules to be applied to the individual meeting participants' state. In other embodiments, the meeting participants' state can be conveyed to a central server which, in turn, can apply the rules to the participants' state. Based on the outcome, the central server can then communicate to the appliance that an obfuscation level is to be selected and applied to one or more assets.

An obfuscation level is selected, at block 806, based on the outcome. So, in this example, the outcome based on application of the rules is that one or more assets are to be obfuscated. This can be because, for example, an individual who is not cleared to view particular assets has entered the meeting room and thus, the meeting participants' state now indicates that an unauthorized individual is present.

At block 808, the obfuscation level is applied to at least one asset that is rendered by the appliance or is to be rendered by the appliance. Obfuscation can take place in any suitable way such as, by way of example and not limitation, visually obscuring an asset, audibly obscuring an asset, or both. The obfuscation level can be applied to an asset that is within the meeting room in which the appliance is located. Alternately or additionally, obfuscation levels can be applied to an asset in a different meeting room that is participating in the shared workspace. So, for example, a large-format appliance in one meeting room may detect that in a remote meeting room, an individual without clearance to consume one or more assets has entered the remote meeting room. Based on this, the large-format appliance can cause the rules to be applied to the individual meeting participants' state and can cause selection and application of an obfuscation level to one or more assets in the remote meeting room. So in essence, a state change in one meeting room may cause assets in the one meeting room or other meeting rooms to be obfuscated. In this manner, the risk associated with unintended asset exposure is mitigated.

In some embodiments, not only can individual meeting participants' state be identified and acted upon as described above, but meeting room events and other events can be identified and acted upon as well. Examples of meeting room events are provided above. For example, a meeting room may be on the street level and have a window that faces the street. If the system, in this case various sensors, detect that the blinds or curtains are open, application of the rules to this meeting room event can result in selection of an obfuscation level which is an applied to one or more assets that are rendered or are to be rendered by the corresponding appliance.

In various embodiments, rules can be constructed to cover any number of scenarios such as rules that pertain to security levels that govern participant access to assets within the shared workspace, permission rules that cover how and when individual participants can interact with assets, privacy concerns, and the like.

Having considered an example method in accordance with one or more embodiments, consider now an example system and device that can be utilized to implement the principles described above.

Example System and Device

FIG. 9 illustrates an example system generally at 900 that includes an example computing device 902 that is representative of one or more computing systems and/or devices that may implement the various techniques described herein. This is illustrated through inclusion of the collaboration service module 112 and collaboration manager module 110. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 818 that are implemented via the platform 916. Accordingly, in an interconnected device embodiment, implementation of functionality described herein may be distributed throughout the system 900. For example, the functionality may be implemented in part on the computing device 902 as well as via the platform 816 that abstracts the functionality of the cloud 914.

CONCLUSION

Various embodiments enable one or more appliances to participate in a shared workspace. The shared workspace can include a single appliance, multiple appliances, a single meeting room, multiple meeting rooms, or any combination thereof. The state of various meeting participants can be identified and one or more rules can be applied to the participants' state to provide an outcome. An "outcome" can be thought of as an action that is to be performed responsive to the identified state. An asset interaction control feature can be selected based on the outcome. The asset interaction control feature controls, in some manner, a participant's interaction with one or more assets that are part of the shared workspace. The asset interaction control feature is then applied to at least one of the assets.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   participating, by an appliance, as part of a shared workspace with one or more other appliances, said participating taking place via one or more networks that enable said appliance and said one or more other appliances to share an asset in different meeting rooms;
   identifying individual meeting participants' state;
   causing one or more rules to be applied to the individual meeting participants' state to provide an outcome, wherein the rules include rules pertaining to asset modification during a collaboration between said appliance and said one or more other appliances to provide an asset-based modification outcome;
   selecting an obfuscation level based on the outcome or the asset-based modification outcome, the obfuscation level for at least said outcome to be applied to the shared asset distinctly for at least one of the different meeting rooms sharing the asset; and
   causing application of the obfuscation level to the asset in said at least one of the different meeting rooms sharing the asset based on said individual meeting participants' state.

2. A method as described in claim 1, wherein said identifying is performed by using one or more sensors associated with the shared workspace.

3. A method as described in claim 1, wherein the participant state is associated with the participant in proximity to the at least one of the different meeting rooms sharing the asset.

4. A method as described in claim 1, wherein the participant state is associated with the participant location within a meeting room the at least one of the different meeting rooms sharing the asset.

5. A method as described in claim 1, wherein the participant state is associated with the participant location relative to a display device in the at least one of the different meeting rooms sharing the asset.

6. A method as described in claim 1, wherein said causing application comprises visually or audibly obscuring the asset.

7. A method as described in claim 1 further comprising identifying a meeting room event for a meeting room the at least one of the different meeting rooms sharing the asset that includes said appliance; and applying the obfuscation level to the asset based on the meeting room event.

8. A method as described in claim 1, wherein said one or more rules pertain to security levels or permission rules that govern participant access to assets within the shared workspace.

9. A method as described in claim 1, wherein a first participant associated with a first appliance may cause a first asset to have a first obfuscation level applied to the first asset on the first appliance, and a second participant associated with a second appliance may cause a second asset to have a second obfuscation level applied to the second asset on the second appliance.

10. One or more computer-readable storage media comprising instructions that are stored thereon that, responsive to execution by an appliance, causes the appliance to perform operations comprising:
    participating, by the appliance, as part of a shared workspace with one or more other appliances, said participating taking place via one or more networks that enable said appliance and said one or more other appliances to share an asset in different meeting rooms;
    identifying individual meeting participants' state;
    applying one or more rules to the individual meeting participants' state to provide an outcome, wherein the rules include rules pertaining to asset modification during a collaboration between said appliance and said one or more other appliances to provide an asset-based modification outcome;
    selecting an asset interaction control feature based on the outcome or the asset-based modification outcome, the asset interaction control feature controlling participant interaction with the shared asset distinctly for at least one of the different meeting rooms sharing the asset; and
    causing application of the asset interaction control feature to affect interaction with the asset in said at least one of the different meeting rooms sharing the asset based on said individual meeting participants' state.

11. One or more computer-readable storage media as described in claim 10, wherein said identifying is performed by using one or more sensors associated with the shared workspace.

12. One or more computer-readable storage media as described in claim 10, wherein said asset interaction control feature is applied to one or more appliances.

13. One or more computer-readable storage media as described in claim 10, wherein the asset interaction control feature comprises an obfuscation level that is utilized to obfuscate the asset in the at least one of the different meeting rooms sharing the asset.

14. One or more computer-readable storage media as described in claim 10, wherein the asset interaction control feature comprises an obfuscation level, wherein said obfuscation level comprises audible or visible obfuscation.

15. One or more computer-readable storage media as described in claim 10, wherein the participant state is associated with the participant entering the at least one meeting room of the different meeting rooms sharing the asset.

16. One or more computer-readable storage media as described in claim 10, wherein the asset interaction control feature comprises an enhancement level that is utilized to enhance the asset in the at least one meeting room of the different meeting rooms sharing the asset.

17. A system comprising:
one or more processors;
one or more computer-readable storage media comprising instructions stored thereon which, responsive to execution by the one or more processors, cause the system to perform operations comprising:
participating, by an appliance, as part of a shared workspace with one or more other appliances, said participating taking place via one or more networks that enable said appliance and said one or more other appliances to share an asset in different meeting rooms;
identifying individual meeting participants' state;
causing one or more rules to be applied to the individual meeting participants' state to provide an outcome, wherein the rules include rules pertaining to asset modification during a collaboration between said appliance and said one or more other appliances to provide an asset-based modification outcome;
selecting an obfuscation level based on the outcome or the asset-based modification outcome, the obfuscation level for at least said outcome to be applied to the shared asset distinctly for at least one of the different meeting rooms sharing the asset; and
causing application of the obfuscation level to the asset in said at least one of the different meeting rooms sharing the asset based on said individual meeting participants' state.

18. A system as described in claim 17, wherein said identifying is performed by using one or more sensors associated with the shared workspace.

19. A system as described in claim 17, wherein the participant state is associated with the participant in proximity to the at least one of the different meeting rooms sharing the asset.

20. A system as described in claim 17, wherein a participant state is associated with a participant in proximity to the at least one of the different meeting rooms sharing the asset and entering the meeting room.

21. A system as described in claim 17, wherein a participant state is associated with a participant location within the at least one of the different meeting rooms sharing the asset.

22. A system as described in claim 17, wherein a participant state is associated with a participant location relative to a display device in the at least one of the different meeting rooms sharing the asset.

23. A system as described in claim 17, wherein said causing application comprises visually or audibly obscuring said at least one asset.

* * * * *